United States Patent

[11] 3,545,549

| [72] | Inventors | Ary van der Lely<br>10, Weverskade, Maasland;<br>Cornelis Johannes Gerardus Bom, 36,<br>Esdoornlaan, Rozenburg, Netherlands |
|---|---|---|
| [21] | Appl. No. | 623,356 |
| [22] | Filed | March 15, 1967 |
| [45] | Patented | Dec. 8, 1970 |
| [32] | Priority | March 30, 1966 |
| [33] | | Netherlands |
| [31] | | No. 6604152 |

[54] SOIL CULTIVATING IMPLEMENTS
6 Claims, 5 Drawing Figs.

[52] U.S. Cl. ................................................ 172/32,
172/123, 172/182, 172/42
[51] Int. Cl. .................................................. A01b 33/16
[50] Field of Search ........................................ 172/42,
112, 122, 32, 554, 182, 123, 117

[56] References Cited
UNITED STATES PATENTS

| 1,279,689 | 9/1918 | Harmon | 172/112X |
| 2,473,770 | 6/1949 | Seaman | 172/32X |
| 2,751,833 | 6/1956 | Hupp | 172/112X |
| 2,795,176 | 6/1957 | O'Hara | 172/112X |
| 2,959,231 | 11/1960 | Heilman | 172/42 |
| 3,123,149 | 3/1964 | White | 172/42 |
| 1,676,646 | 7/1928 | Funk | 172/123X |

FOREIGN PATENTS

| 1,189,647 | 3/1959 | France | 172/112 |
| 618,658 | 2/1949 | Great Britain | 172/117 |
| 95,045 | 9/1959 | Norway | 172/123 |

*Primary Examiner*—Robert E. Bagwill
*Assistant Examiner*—Alan E. Kopecki
*Attorney*—Mason, Mason & Albright

ABSTRACT: According to the present invention there is provided a soil cultivating implement comprising a frame, a rotary shaft journalled in the frame and extending substantially transversely of the intended direction of operative travel of the implement, working members carried by the rotary shaft, and a prime mover for moving the implement in operation, the rotary shaft being arranged to be driven in operation so that during their passage through the soil the working members move in the direction of travel of the implement.

PATENTED DEC 8 1970

3,545,549

SHEET 1 OF 3

INVENTORS
ARY VAN DER LELY
CORNELIS JOHANNES GERARDUS BOM
BY
Mason, Mason & Albright
Attorneys

SOIL CULTIVATING IMPLEMENTS

Figure 1:
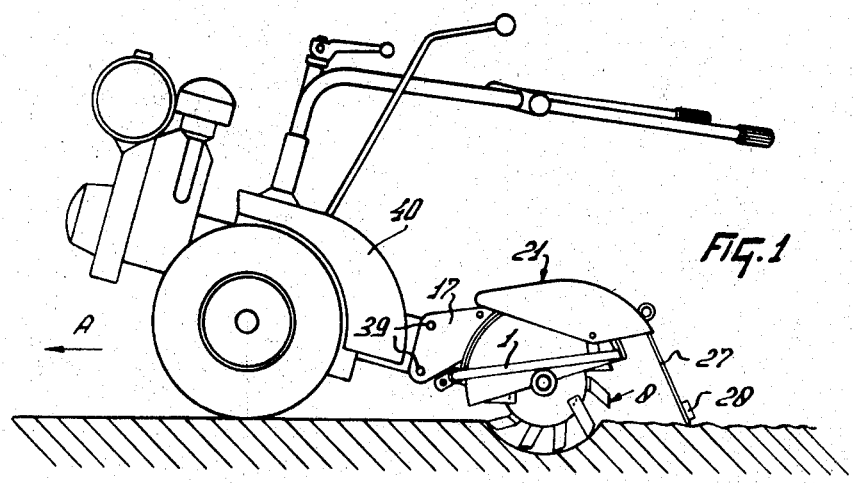
Figure 2:
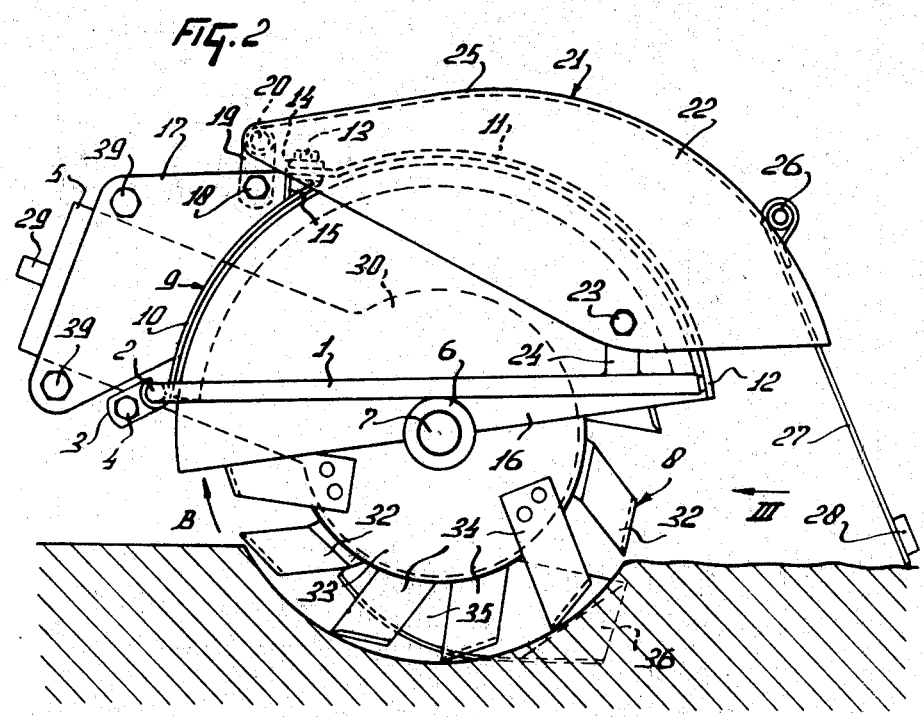
Figure 3:
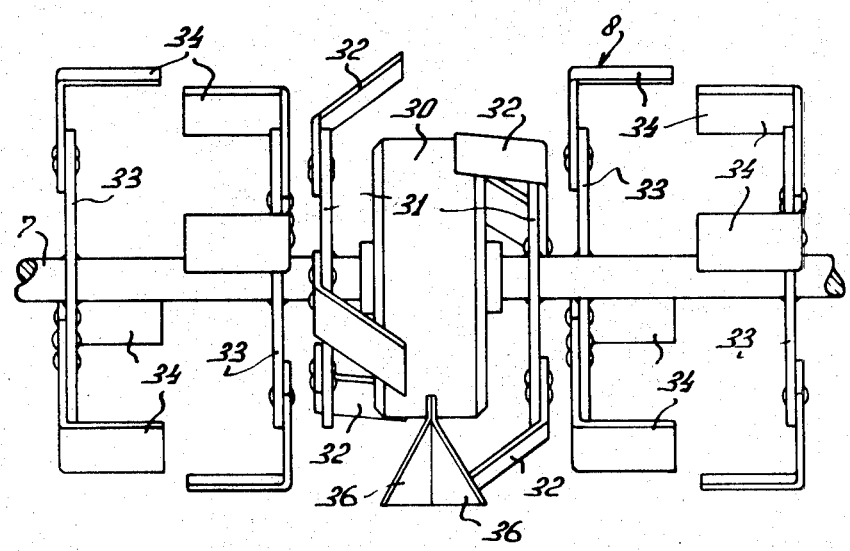
Figure 4:
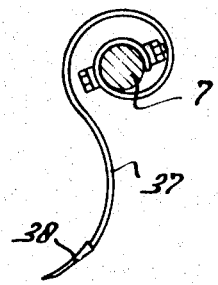

For a better understanding of the invention and to show how the same may be carried into effect, reference will now be made, by way of example, to the accompanying drawings, in which:

FIG. 1 is a side view of a soil cultivating implement, the implement being shown coupled to a single-axle tractor, FIG. 2 is a side view, on a larger scale, of the soil cultivating implement of FIG. 1, FIG. 3 is a rear view of the implement as shown in FIG. 2, the view being taken in the direction of the arrow III of FIG. 2, and FIG. 4 shows a form of resilient working member that can be provided in the implement of FIGS. 1 to 3.

Figure 5:
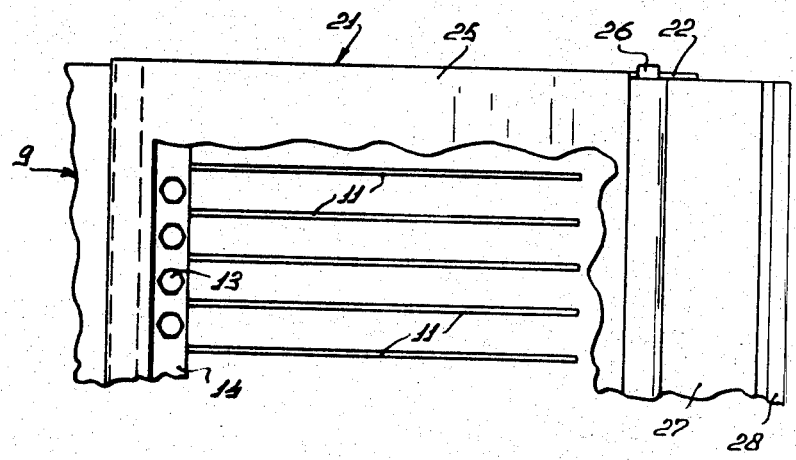

FIG. 5 is a plan view in part of the hood for the implement shown in FIGS. 1—3, parts broken away to show the rods.

The soil cultivating implement shown in FIGS. 1 to 3, has a frame that includes two spaced frame beams 1 which extend in the intended direction of operative travel of the implement. Each of the frame beams 1 is provided with a portion 2 that extends transversely of the intended direction of operative travel and that is fastened by means of a lug 3 and bolt 4 to a housing 5 located centrally with respect to the frame beams 1. Near the center of each of the frame beams 1 there is provided a bearing 6 that accommodates a rotary shaft 7 extending transversely of the intended direction of operative travel. The rotary shaft 7 carries soil cultivating members 8 which are fastened to the rotary shaft 7 in the manner to be described more fully hereinafter.

The rotary shaft 7 is surrounded, at least partly, by a screening hood 9 which has a closed portion 10 at the front and an apertured portion 11 at the rear. The closed portion 10 extends on either side of the housing 5 and is secured to the portions 2 of the frame beams 1. The apertured portion 11 is formed by a grating. This grating is composed of a plurality of spaced, spring-steel bars 12 which surround the rotary shaft 7 so as to substantially concentrical therewith as is shown in FIG. 2. The bars 12 have each a circular cross section of about 7 mms. diameter and are secured by means of bolts 13 and a clamping strip 14 to an angle-section iron 15 extending transversely of the intended direction of operative travel and disposed near the end of the closed screening portion 10 remote from the portions 2 of the frame beams 1. The distance between each adjacent pair of bars is smaller than 5 cms. and in the particular form of implement being described amounts to 4.5 cms.

On either side of the screening hood 9 vertical plates 16 are secured to the frame beams 1 (see FIG. 2).

Vertical plates 17 extend forwardly from the front of the closed portion 10 of the screening hood 9 on either side of the housing 5. By means of a bolt 18 a tag 19 is secured to an upper portion of each of the plates 17. The tags 19 form a support for a pipe 20 extending transversely of the intended direction of operative travel and parallel to the rotary shaft 7. The pipe 20 supports the front of a second screening hood 21 made up of a slightly arcuate portion 25, extending away from the pipe 20 to the rear, and a substantially straight portion 27 pivotally connected to the end of the portion 25 remote from the pipe 20 by means of pins 26. It will be noted that the axis about which the portion 27 can pivot is above the shaft 7.

The screening hood 21, as will be seen from FIGS. 1 and 2, is located entirely on the side of the apertured portion 11 of the first screening hood 9 that is remote from the shaft 7 and is provided on either side with vertical plates 22. The plates 22 are fastened by means of bolts 23 to tags 24 disposed near the rear of the frame beams 1. Part of the portion 27 of the hood 21 is located between the plates 22 and carries near its free end a readily removable strip 28. Thus strips 28 of different weights may be secured to the portion 27 to vary the pressure with which the portion 27 acts on the ground. Instead of strips, weights of other shapes (not shown) may be used.

The housing 5 accommodates a driving shaft 29 which is linked to the rotary shaft 7 by means of a bevel gear wheel transmission (not shown) arranged in a gear box 30 connected with the housing 5. As will be apparent from FIG. 3, the gear box 30 is located approximately near the center of the rotary shaft 7. On either side of the gear box, at a short distance therefrom, the rotary shaft 7 carries circular plates 31 which, in turn, carry working members 32 spaced equidistantly around the circumferences of the plates 31. These working members 32 have the shape of blades which are bent over through an angle of about 60° near the circumferences of the plates 31. On each side of the pair of plates 31 the shaft 7 carries a pair of circular plates 33 carrying working members 34. The plates 33 of each pair are spaced apart by the same distance. The working members 34 are, like the working members 32, disposed at equal distances apart around the circumferences of the plates 33, and the members carried by one plate of each pair are bent over towards the members carried by the other plate, near their centers, through an angle of about 90°, so that the working members 34 arranged on the outermost plates 33 have a bent-over portion extending towards the gear box 30. The working members 32 and 34 are otherwise arranged in known manner so that, viewed along the axis of rotation of the rotary shaft 7, they follow a helical line.

Beneath the gear box 30 two plates 35, lying one against the other, extend in the intended direction of operative travel and are bent over away from each other at the rear over a portion 36. The lower sides of the plates 35, which are slightly bent over in the form of an arc in upward direction are provided with a cutting edge.

FIG. 4 shows a construction in which the working members 32 and 34 in the form of blades are replaced by spring-steel tines 37 with removable ends 38.

For moving the soil cultivating implement it is coupled, as shown in FIG. 1, with the single-axle tractor 40 by means of the plates 17 and bolts 39 provided at the front of the screening hood and located on either side of the housing 5. The front end of the driving shaft 29, which is splined, is linked to the engine of the tractor.

The implement described above operates as follows:

The tractor is operated to move the implement in the direction of arrow A of FIG. 1 and the rotary shaft 7 is rotated in the direction of arrow B (FIG. 2) by way of the driving shaft 29 coupled with the tractor engine and the transmission in the gear box 30. The working members 32 and 34 of the rotary shaft 7, forming together a rotor of a diameter of more than 45 cms., move, in operation, through the soil in the direction of travel. This direction of movement facilitates the penetration of the working members into the soil, while, in operation, the working members do not tend to emerge from the soil. This ensures a satisfactory run of the implement in operation. The soil cut loose and carried along by the cutting members is conveyed upwards by way of the closed portion 10 of the screening hood 9, after which the loose soil is pushed through the apertures in the portion 11, that is to say between the bars 12, whereas the solid obstacles in the soil are conducted via the bars 12 into the furrow formed by the working members. The second screening hood 21 extending around the bars 12 prevents the soil that passes between the bars 12 from being thrown out too far and guides this soil, via the pivotable portion 27 at the rear, into the furrow. By means of the pivotable portion 27 and the different weights that can be arranged thereon the soil can be flattened in a desired manner. As will be seen from FIG. 3, the strip of soil located beneath the gear box 30 is worked by the knife edges formed on the plates 35 and by the ends of the working members 32. The bent-over portions 36 at the rear of the plates 35 are adapted to cooperate with the bent-over ends of the working members 32 which move around part of the box 30 during their rotation. The rectangularly bent-over ends of the outermost cutting members 34 prevent, in operation, the soil from being thrown in excessive quantities to the sides, which might give rise to an inadequate effect.

It will be appreciated that the implement as described above is provided with a prime mover that is a single-axle tractor.

This tractor constitutes a two-wheel support for the implement, at least one of these two wheels being driven. In a modified form of implement, not shown, the implement is itself provided with a prime mover comprising a two wheel support, whereby the wheels lay somewhat before the rotary shaft.

We claim:

1. A soil cultivating implement, comprising a frame, a rotary shaft journaled in said frame to extend substantially transversely of the intended direction of operative travel of the implement, a plurality of soil working members mounted on said rotary shaft, and a prime mover for operating said implement, said rotary shaft being driven for moving said working members through the soil in the direction of travel of said implement, a hood including an apertured member mounted on said implement above said working members and partly to the rear of said rotary shaft, said apertured member being positioned above the path of said soil working members during rotation thereof, a portion of said hood being positioned in front of said working members, a further hood, supported by said frame above said first mentioned hood, to be positioned substantially entirely above said apertured member and said rotary shaft, said further hood having a pivotable trailing portion that rides on the ground, said trailing portion pivotally connected to said hood on an axis above and to the rear of said rotary shaft, said pivotable portion including pressure means for adjusting the pressure that said pivotable portion exerts on the soil.

2. An implement as claimed in claim 1, wherein said pressure means comprises movable weights.

3. A soil cultivating implement as claimed in claim 1, wherein said apertured portion is a grating, comprising a plurality of equidistant bars, arranged substantially concentrical with said rotary shaft.

4. An implement as claimed in claim 1, wherein said further hood is connected to said implement in front of said rotary shaft.

5. An implement as claimed in claim 1, wherein said implement has a driving system for driving said rotary shaft, said system including a driving shaft, extending through the front of said first mentioned hood and linked to said rotary shaft by a gear wheel transmission in a housing, said transmission located substantially at the center of said rotary shaft, said soil working members being positioned on either side of said transmission and said members having a part extending substantially parallel to said rotary shaft, whereby during operation, said ends move at least partly around said transmission housing.

6. An implement as claimed in claim 5, wherein said parts are bent over through an angle of at least 60°.